(12) United States Patent
Frett et al.

(10) Patent No.: US 7,422,401 B2
(45) Date of Patent: Sep. 9, 2008

(54) "B" HOOK RETAINER FOR RAILCAR ANCHOR AND LOAD SNUGGER ARRANGEMENT FOR SECURING CARGO

(76) Inventors: John W. Frett, 3225 E. Exchange St., Crete, IL (US) 60417; William L. Volk, 1000 Holland Dr., Crete, IL (US) 60417; John B. Brewster, 2060 Hawthorne Rd., Homewood, IL (US) 60430

( * ) Notice: Subject to any disclaimer, the term of this patent is extended or adjusted under 35 U.S.C. 154(b) by 127 days.

(21) Appl. No.: 11/463,704

(22) Filed: Aug. 10, 2006

(65) Prior Publication Data

US 2007/0212185 A1      Sep. 13, 2007

Related U.S. Application Data

(60) Provisional application No. 60/707,722, filed on Aug. 12, 2005.

(51) Int. Cl.
  *B60P 7/08*          (2006.01)
(52) U.S. Cl. .................. 410/106; 410/97; 410/110; 410/116
(58) Field of Classification Search .......... 410/97, 410/101, 106, 110, 116; 105/355; 24/68 CD, 24/265 CD, 115 K; 248/499
  See application file for complete search history.

(56) References Cited

U.S. PATENT DOCUMENTS

| | | | |
|---|---|---|---|
| 6,494,651 B1 | 12/2002 | Zhan et al. | |
| 6,585,466 B2 | 7/2003 | Zhan et al. | |
| 6,626,623 B2 * | 9/2003 | DeLay | .................... 410/116 |
| 6,709,209 B2 | 3/2004 | Zhan et al. | |

* cited by examiner

*Primary Examiner*—Stephen Gordon
(74) *Attorney, Agent, or Firm*—David C. Brezina; Barnes & Thornburg LLP (57) ABSTRACT

A B-hook retainer shaped and configured so as to maintain retention of B-hook hardware in a shaped aperture that secures various and multiple types of lading tie straps and strap hardware comprising of straps of woven webbing. The lading tie strap being held in place by the appropriate B-hook provision and the said anchor being contained within a pocket in the wall or floor of railway box or flat car. Various industry lading tie straps with said B-hook already in use are allowed to be connected to the shaped aperture anchor. An appropriate ratchet inherent to the specific type of tie strap being used is operated to remove any remaining slack in the lading ties and then apply the desired tension thereon to secure the lading to the railway car. If slack develops in the lading ties due to transport load shifting the B-hook retainer will prevent inadvertent removal of the B-hook from the shaped aperture resulting in lading tie strap no longer securing the lading to the railway car.

14 Claims, 10 Drawing Sheets

"B" HOOK RETAINER FOR RAILCAR ANCHOR AND LOAD SNUGGER ARRANGEMENT FOR SECURING CARGO

CLAIM OF PRIORITY

Priority is claimed based on Provisional Application Ser. No. 60/707,722 filed Aug. 12, 2005.

BACKGROUND OF THE INVENTION

Loads on railway cars need to be restrained from shifting under the various loads imposed by draft, buff, and rocking of the car. For particular types of loads, such as large rolls or coils of sheet material, or palletized loads, tensioning mechanisms using straps and anchors are advantageous.

To avoid the limitations with present practices of prior art the invention relates generally to the improvement in lading tie anchor systems for railway cars. Prior art is specific to a "B" hook and is limited to its own inherent arrangement. The invention combines a distinct element into an improved cargo lading tie anchor system so as to offer the user more versatility in securing cargo.

This novel "B" hook retainer is adapted to an industry "B" hook or anchor arrangement to assure that the "B" hook remains retained in the anchor aperture during transport of the cargo lading and all transport conditions.

Occasionally, during transport of the cargo lading, the cargo lading may shift due to the inherent flexibility of some lading tie strap materials and the lading tie strap will develop slack. This lading tie strap slack will result in loosening the "B" hook in its respective anchor aperture. A loose "B" hook in its respective anchor aperture could inadvertently come out of the anchor aperture when subjected to the appropriate transport conditions that would cause such an action. The "B" hook coming out of the anchor would result in the lading tie strap no longer being capable of properly securing said cargo lading. The invention assures that the "B" hook will not come out of the anchor aperture without some type of intervention by personnel as set forth herein.

The invention also provides a lading tie anchor system and method of using the same that can use various lading tie straps, bands or "B" hooks already in use and practice with various railway cars.

The "B" hook retainer is mountable onto a "B" hook, in a wall, deck or support of a vehicle so that the lading tie anchor system can be adapted to different load conditions including a different mix of lading.

DESCRIPTION OF RELATED ART

U.S. Pat. No. 6,709,209 teaches a railcar apparatus, multiple anchor arrangement and snugger arrangement, cargo snugger strap and "B" hook device with a particularly shaped tie anchor with a hole shaped aperture, where said system is dependant upon cargo straps and hook device tailored to fit the specific hole shaped aperture anchor. The disclosure in this patent is incorporated by reference in the instant application as if fully set forth herein.

U.S. Pat. No. 6,585,466 teaches a railcar anchor and snugger arrangement, cargo snugger strap and "B" hook device with a particularly shaped tie anchor with a hole shaped aperture, where said system is dependant upon cargo straps and hook device tailored to fit the specific hole shaped aperture anchor. The disclosure in this patent is incorporated by reference in the instant application as if fully set forth herein.

U.S. Pat. No. 6,494,651 teaches a railcar anchor and snugger arrangement, cargo snugger strap and "B" hook device with a particularly shaped tie anchor with a hole shaped aperture, where said system is dependant upon cargo straps and hook device tailored to fit the specific hole shaped aperture anchor. The disclosure in this patent is incorporated by reference in the instant application as if fully set forth herein.

The foregoing prior art teaches certain parameters for lading tie anchor and lading tie strap systems and uses specific solutions to meet the needs. The instant invention departs from the limited functionality in its use of the "B" hook being specific to transport conditions and arrangements that assure that the "B" hook will not come out of the respective anchor aperture. Additionally, the prior art typically uses specific hardware that is dedicated for its specific use and is limited in its versatility and its nature. The instant invention utilizes simple, yet offers retainer provisions tailored to provide proper retention for the multiple lading tie hardware configurations and not limited to a specific shaped aperture anchor which offers a real advantage for the user so the user is not limited to usage of a limited strap hardware provision.

DETAILED DESCRIPTION OF THE PREFERRED EMBODIMENT

Figure 1:
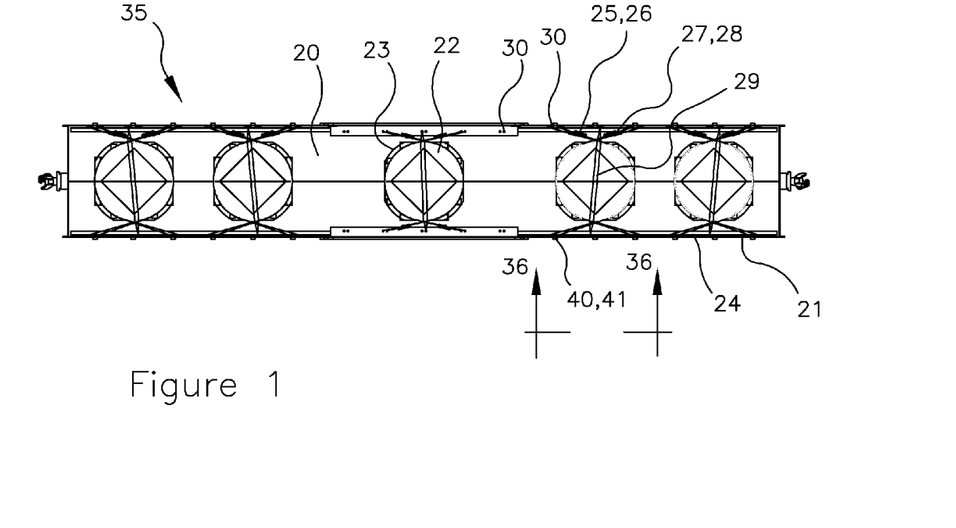
FIG. 1 is a largely horizontal view of support surfaces to which the indicated anchors and lading tie straps have been applied, and several cargo pallet loads to be supported thereon, which support surface may be, for instance, the wall or deck of a railway box car.

Referring now to FIG. 1, there is illustrated a railway car 35 in somewhat of a largely horizontal manner support 20 upon which a cargo pallet 23 with lading 22 is to be secured by way of use of a typical industry cargo lading tie strap 25, 26, 27, 28, 29 that includes B-hook 40 or 41 that are secured within anchor aperture 30. Anchor aperture 30 is provided in multiples and are included within horizontal support 20 and/or car structure 24 of vertical wall 21 of railway car 35. Hardware is arranged in accordance with the principles of the present invention herein disclosed.

Figure 2:
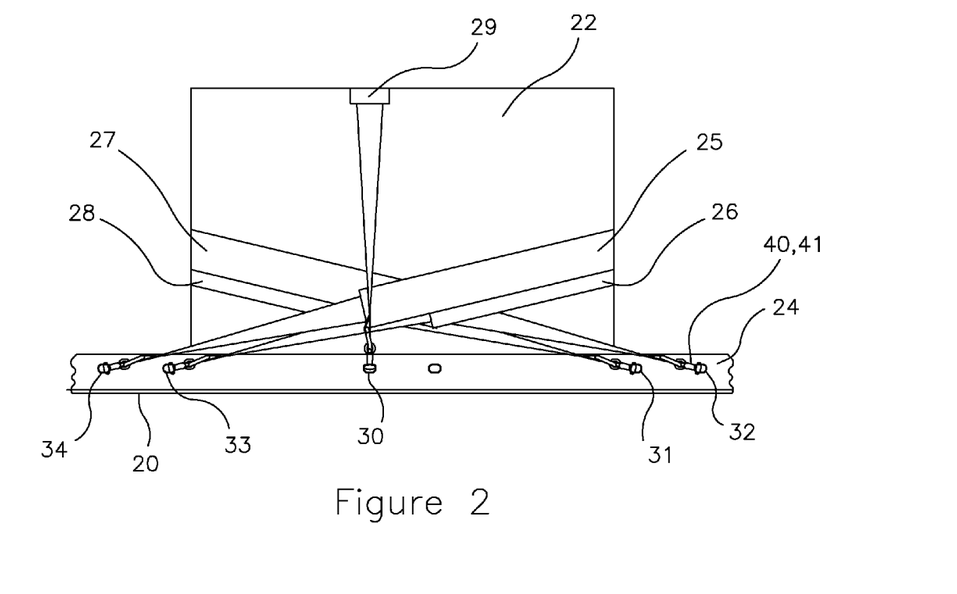
FIG. 2 is a side elevational view taken on view 36 of FIG. 1 showing anchor apertures disposed to receive the various types of conventional lading tie straps and/or connecting B-hook hardware illustrating securement of a cargo pallet load.

FIG. 2 is a side elevational view taken on view 36 of FIG. 1 illustrating one example of a typical secured arrangement of lading 22. The car structure 24 of vertical wall support 21 upon which a cargo lading tie straps 25, 26, 27, 28, 29 are to be secured by B-hook 40 or 41 that, in this regard, are arranged in accordance with the principles of the present invention herein disclosed. The supports 20 and 21 may, for instance, be a deck or floor of a railway flat car or other rail transport vehicle 35, or supports 20 and 21 may be another type of vehicle to which the anchor aperture 30 is applied in multiples such as 31, 32, 33, 34 for the usual application thereof to lading 22 with or without cargo pallets 23. The wall support 21 may, for instance, be a wall or bulkhead of a railway boxcar or other rail transport vehicle 35, or wall support 21 may be another type of vehicle to which the anchor aperture 30 is applied in multiples for the usual application thereof to lading 22 with or without cargo pallets 23.

Figure 3:
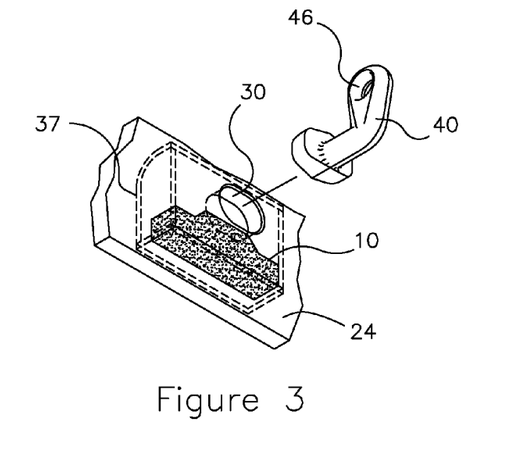
FIG. 3 is a diagrammatic perspective view showing an anchor aperture, support surfaces and independently mounted B-hook retainer disposed to receive the B-hook.

The principles of the present invention are applicable to retaining B-hook 40 or alternate B-hook 41 within anchor aperture 30. FIGS. 3, 4, 5, 7 illustrates preferred embodiments of the applicant's invention. In the FIG. 3 is illustrated an anchor aperture 30 in car structure 24 with B-hook retainer 10 contained and supported by additional car structure 37. B-hook 40 is shown disposed for insertion through anchor aperture 30. Cargo lading tie straps 25, 26, 27, 28, 29 are attached to multiples of B-hook 40 by way of through hole provision 46. B-hook retainer 10 is preferred when it is desired to assure that B-hook 40 is retained within anchor aperture 30 by use of a retention method independent and not connected to B-hook 40.

Figure 4:
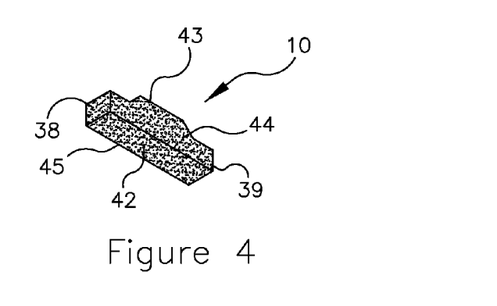
FIG. 4 is a diagrammatic perspective view showing the independently mounted B-hook retainer.

Applicant's preferred independent B-hook retainer 10 is illustrated in FIG. 4. Preferred independent B-hook retainer 10 consists of six sides 38, 39, 42, 43, 44, 45 that are tailored appropriately to be supported by the desired car structures 24, 37.

Figure 5:
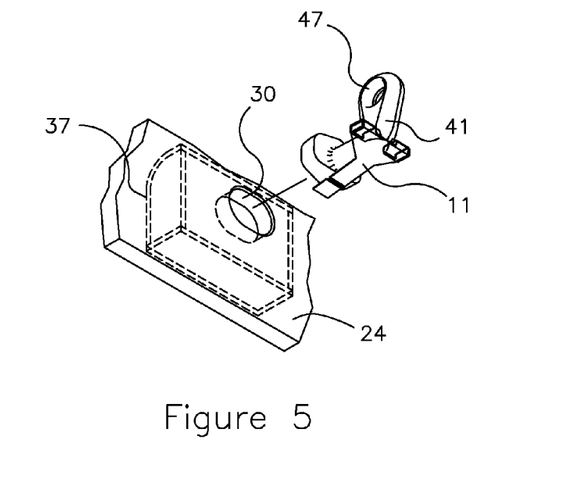
FIG. 5 is a diagrammatic perspective view showing an anchor aperture and support surfaces disposed to receive the B-hook with an integral B-hook retainer.

In the FIG. 5 is illustrated an anchor aperture 30 in car structure 24 with B-hook retainer 11 attached to B-hook 41. B-hook 41 is shown disposed for insertion through anchor aperture 30. Cargo lading tie straps 25, 26, 27, 28, 29 are attached to multiples of B-hook 41 as per prior art by way of through hole provision 47. B-hook retainer 11 is preferred when it is desired to assure that B-hook 41 is retained within anchor aperture 30 by use of a retention method independent and not included within car structure 24.

Figure 6:
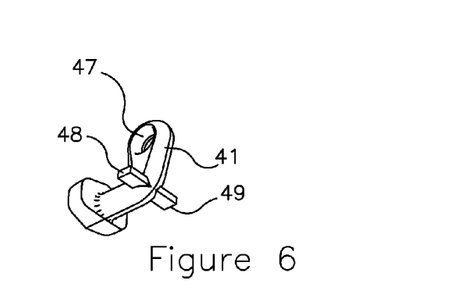
FIG. 6 is a diagrammatic perspective view showing an alternative B-hook with tab provisions for supporting alternate integral B-hook retainer.
Figure 7:
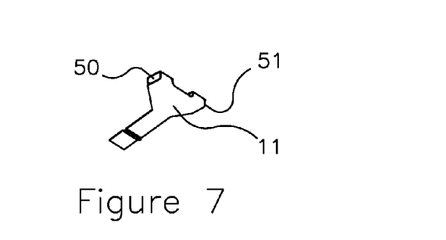
FIG. 7 is a diagrammatic perspective view showing an alternate integral B-hook retainer.

B-hook 41 in FIG. 6 illustrates that B-hook 41 is substantially the same as B-hook 40 with the addition of protrusions 48 and 49. Protrusions 48 and 49 are tailored to offer fixation and support for B-hook retainer 11 shown in FIG. 11. B-hook retainer 11 is shaped with tabs 50 and 51 that are formed onto protrusions 48 and 49 of B-hook 41. These features are allowed to be tailored for the intended purpose and will be apparent to those skilled in the art.

Figure 8:
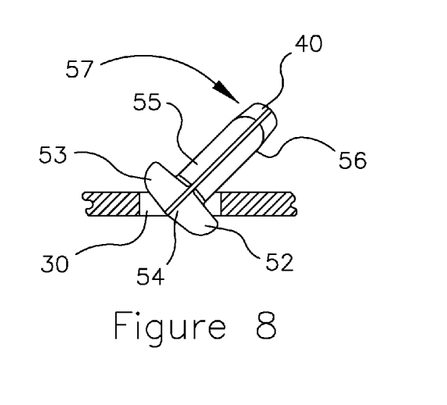
FIG. 8 is a sectional horizontal view of the anchor aperture with the B-hook disposed at an angle and starting to be inserted into the anchor aperture.
Figure 9:
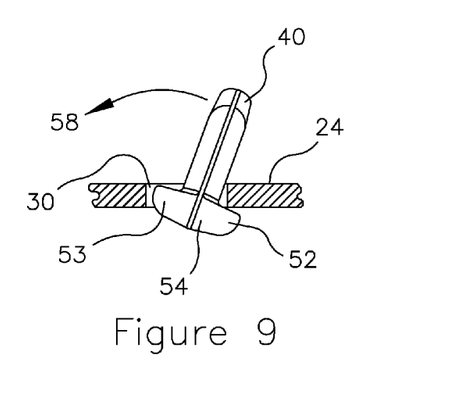
FIG. 9 is a sectional horizontal view of the anchor aperture with the B-hook disposed at an adjusted angle to accommodate the further insertion of the B-hook into the anchor aperture.

Illustrated in FIGS. 8 through 13 is the method of insertion and orientation of B-hook 40 in anchor aperture 30. FIG. 8 is a sectional horizontal view showing the initial step of tipping B-hook 40 sideways along a path 57 so B-hook 40 is allowed to be partially inserted into the slotted shape anchor aperture 30. B-hook 40 has lobes 52 and 53 that are combined to form B-hook head 54. B-hook head 54 is combined with B-hook neck 55 and leg 56 to form B-hook 40. B-hook 40 must be tipped for insertion because B-hook head 54 is sized larger than anchor aperture 30 so as to provide proper application function but B-hook head 54 is also sized appropriately so as to be allowed to be inserted into anchor aperture 30 by way of tipping B-hook 40 as shown in FIGS. 8 and 9.

Once lobe 52 of B-hook 40 has past through anchor aperture 30 B-hook lobe 52 is allowed to translate behind car structure 24 so as to allow B-hook 40 to be tipped back following a path 58 so as to allow insertion of lobe 53 through anchor aperture 30 as shown in FIG. 9.

B-hook lobes 52 and 53 are substantially similar and symmetrical along the center of B-hook 40. FIGS. 8 and 9 illustrate B-hook 40 being tipped to the right but because B-hook lobes 52 and 53 are substantially similar and symmetrical along the center of B-hook 40 and anchor aperture 30 is also substantially symmetrical B-hook 40 is also allowed to be inserted through anchor aperture 30 by tipping B-hook 40 to the left and may be considered bi-directional. These features are illustrated as symmetrical but are not required for the intended purpose and therefore are allowed to be tailored and will be apparent to those skilled in the art.

Figure 10:
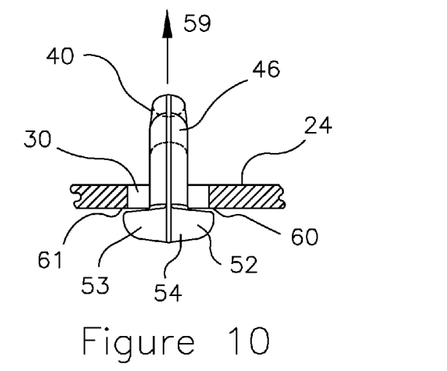
FIG. 10 is a sectional horizontal view of the anchor aperture with the B-hook inserted within the anchor aperture disposed at a substantially perpendicular angle to the frontal face of the anchor aperture provision.

FIG. 10 is a sectional horizontal view showing both lobes 52, 53 of B-hook 40 positioned through anchor aperture 30 and behind car structure 24. When tension is applied to B-hook 40 by way of hole provision 46 along path 59 lobes 52, 53 are sized so as to contact back areas 60, 61 respectively of car structure 24 to secure lading 22.

Figure 11:
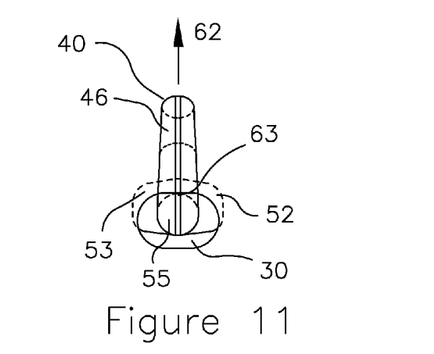
FIG. 11 is a frontal elevational view of the arrangement shown in FIG. 10 with the B-hook disposed in an upward orientation in respect to the anchor aperture provision as would be the case when tension is applied to the lading tie strap.

A frontal elevational view of the arrangement shown in FIG. 10 with the B-hook 40 disposed in an upward orientation along path 62 in respect to anchor aperture 30 as would be the case when tension is applied by way of through hole provision 46 is shown in FIG. 11. B-hook neck 55 is shown pulled up against and making contact at surface 63 of anchor aperture 30. Lobes 52, 53 of B-hook 40 are shown behind car structure 24 respectively. The combination of lobes 52, 53 and B-hook neck 55 of B-hook 40 making contact with car structure surfaces 60, 61, 63 respectively provides proper support to secure lading 22. FIG. 11 illustrates the upwards orientation of B-hook 40 with respect to anchor aperture 30 as would be the case for overhead securing of lading 22 by way of lading tie strap 29 as shown in FIG. 2.

Figure 12:
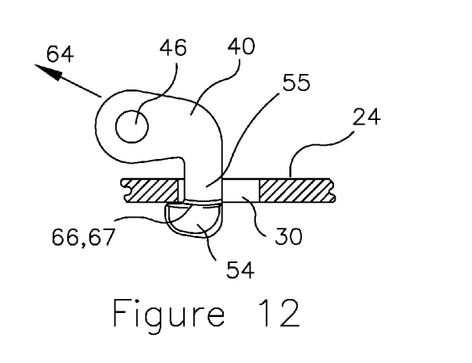
FIG. 12 is a sectional horizontal view of the anchor aperture with the B-hook inserted within the anchor aperture provision along with the B-hook being rotated at substantially 90 degrees within the anchor aperture to what is illustrated in FIG. 10.

FIG. 12 is a sectional horizontal view of what is shown in FIG. 10 with B-hook 40 rotated 90 degrees about the axis of B-hook neck 55. FIG. 12 illustrates the sideward orientation of B-hook 40 along tension path 64 with respect to anchor aperture 30 as would be the case for longitudinal and lateral securing of lading 22 by way of lading tie straps 25, 26, 27, 28 as shown in FIG. 2.

Figure 13:
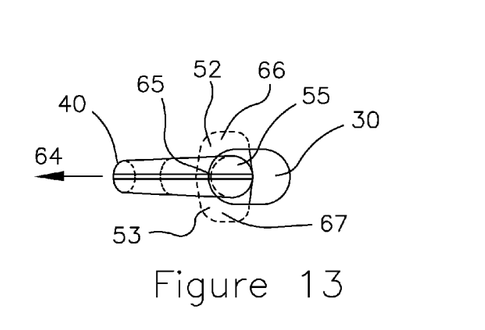
FIG. 13 is a frontal elevational view of the arrangement shown in FIG. 12 with the B-hook disposed in a sideward orientation in respect to the anchor aperture provision shown.

A frontal elevational view of the arrangement shown in FIG. 12 is shown in FIG. 13. B-hook neck 55 is shown pulled up against and making contact at surface 65 of anchor aperture 30. Lobes 52, 53 of B-hook 40 are shown behind car structure 24 respectively. The combination of lobes 52, 53 and B-hook neck 55 of B-hook 40 making contact with car structure surfaces 66, 67, 65 respectively provides proper support to secure lading 22.

Figure 14:
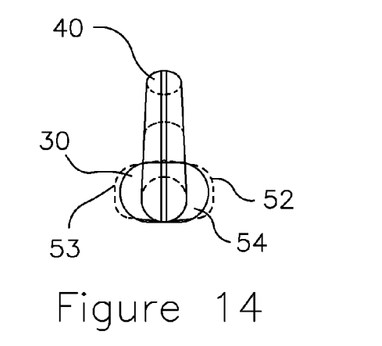
FIG. 14 is a frontal elevational view of the arrangement shown in FIG. 10 with the B-hook disposed in a position after being inserted into the anchor aperture and disposed at a substantially perpendicular angle to the frontal face of the anchor aperture provision prior to being located in relation to the anchor aperture by tensioning the lading tie straps.
Figure 15:
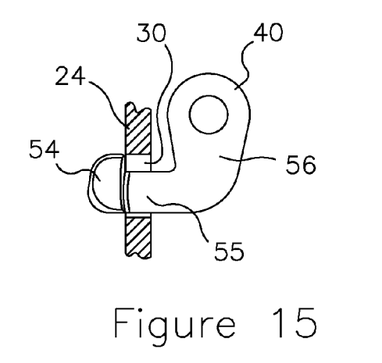
FIG. 15 is a side elevational view of the arrangement shown in FIG. 14 with the B-hook disposed in a position after being inserted into the anchor aperture provision.
Figure 16:
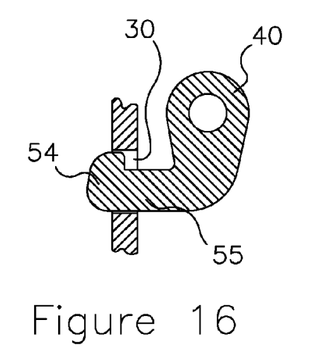
FIG. 16 is a side elevational view of the arrangement shown in FIG. 9 with the B-hook disposed in a partially inserted position into the anchor aperture and disposed at a substantially non-perpendicular angle in relation to the frontal face of the anchor aperture as illustrated in FIG. 9.

The frontal elevational view in FIG. 14 shows that lobes 52, 53 of B-hook 40 are disposed centrally in respect to anchor aperture 30 as is the case prior to removal of B-hook 40 from anchor aperture 30. A side elevational view of FIG. 14 is shown in FIG. 15 further illustrating B-hook head 54 substantially aligned with anchor aperture 30. FIG. 16 illustrates a side elevational view of B-hook head 54 along with B-hook neck 55 of B-hook 40 orientated and moved partially through anchor aperture 30 when B-hook 40 is tipped sideways as shown in FIG. 9.

Figure 17:
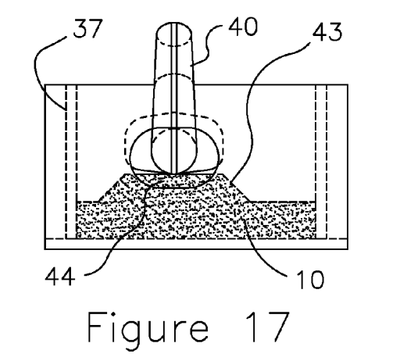
FIG. 17 is a frontal horizontal view showing an anchor aperture, support surfaces and independently mounted B-hook retainer with the B-hook disposed in a substantially upward orientation.

FIG. 17 further illustrates a frontal elevational view of what is shown in FIG. 11 along with B-hook retainer 10 contained and supported by additional car structure 37. B-hook retainer 10 consists of a compressible and resilient material so that when B-hook 40 is maneuvered through anchor aperture 30 as illustrated in FIGS. 8 through 11 B-hook retainer 10 inherently compresses to allow such action. Side 43 of B-hook retainer 10 is sized and shaped so as to provide lift to B-hook 40 and maintain retention of B-hook 40 in anchor aperture 30 when slack develops in lading tie strap 29. Side 44 of B-hook 40 that is adjacent to anchor aperture 30 is sized and shaped so as to close off part of the opening in anchor aperture 30. To remove B-hook 40 from anchor aperture 30 as illustrated in FIGS. 14 through 16 sides 43, 44 of B-hook retainer 10 compress to allow such action.

Figure 18:
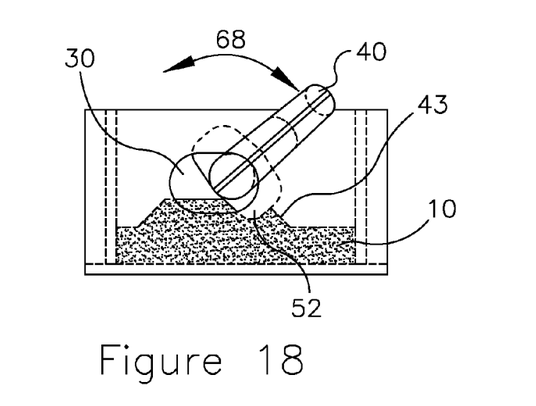
FIG. 18 is a frontal horizontal view showing an anchor aperture, support surfaces and independently mounted B-hook retainer with the B-hook disposed at a rotated angle from the upward orientation as illustrated in FIG. 17.

Illustrated in FIG. 18 is side 43 of B-hook retainer 10 being compressed to allow lobe 52 of B-hook 40 to rotate through a path 68. This action allows angular orientation of lading tie straps 25, 26, 27, 28 respectively as illustrated in FIG. 2. When slack develops in lading tie straps 25, 26, 27, 28 side 43 of B-hook retainer 10 is sized and shaped so as to provide lift and rotation back through path 68 to B-hook 40 as shown in FIG. 17 and maintain retention of B-hook 40 in anchor aperture 30.

Figure 19:
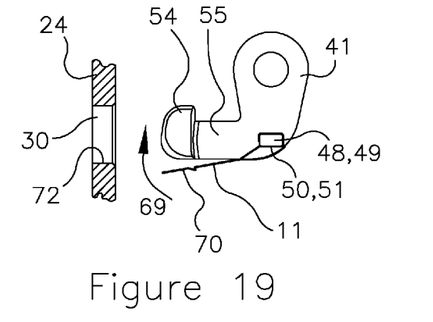
FIG. 19 is a side elevational view of the arrangement shown in FIG. 5 with the B-hook with an integral B-hook retainer disposed to enter an anchor aperture.

The side elevational view of FIG. 19 further illustrates a B-hook 41 retention method independent and not included within car structure 24 from what is shown in FIG. 5. Leg 70 of B-hook retainer 11 is shown disposed in its free state in respect to B-hook neck 55 of B-hook 41. B-hook retainer 11 consists of a flexible material that allows leg 70 of B-hook retainer 11 to pivot about tabs 50, 51 of B-hook retainer 11 that are attached to protrusions 48, 49 of B-hook 41 and flex along a path 69. In practice leg 70 of B-hook retainer 11 is flexed along path 69 against B-hook neck 55 to allow insertion of B-hook 41 and B-hook retainer 11 through anchor aperture 30 in car structure 24.

Figure 20:
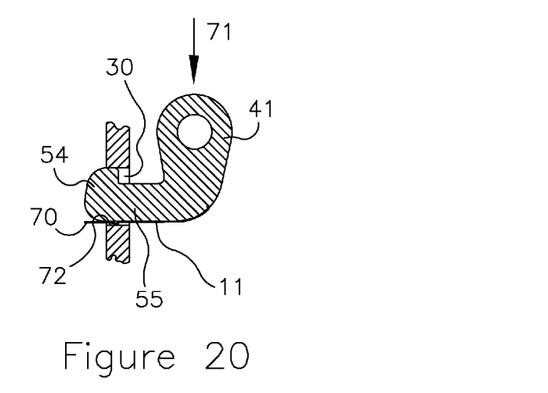
FIG. 20 is a side elevational view of the arrangement shown in FIG. 19 with the B-hook with an integral B-hook retainer partially inserted into the anchor aperture with the B-hook retainer disposed against the neck of the B-hook so as to allow such action.

FIG. 20 illustrates a sectional side elevational view of B-hook head 54 along with B-hook neck 55 of B-hook 41 and leg 70 of B-hook retainer 11 orientated and moved partially through anchor aperture 30 when B-hook 41 is tipped sideways similar to what is shown in FIGS. 8 and 9. A force 71 is applied to B-hook 41 so as to dispose leg 70 of B-hook retainer 11 against surface 72 in anchor aperture 30 that also disposes leg 70 up against B-hook neck 55 of B-hook 41 allowing such insertion action.

Figure 21:
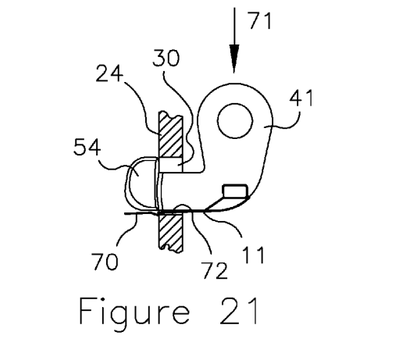
FIG. 21 is a side elevational view of the arrangement shown in FIG. 20 with the B-hook with an integral B-hook retainer substantially inserted into the anchor aperture with the B-hook retainer disposed against the neck of the B-hook so as to allow such action.

B-hook head 54 of B-hook 41 is shown further disposed through anchor aperture 30 in FIG. 21 and force 71 is shown maintaining B-hook 41 and leg 70 disposed against surface 72 of anchor aperture 30.

Figure 22:
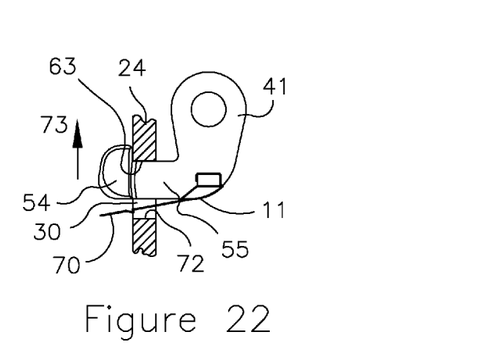
FIG. 22 is a side elevational view of the arrangement shown in FIG. 21 with the integral B-hook retainer disposed so as to lift the B-hook in a substantially upward orientation in respect to the anchor aperture provision.

FIG. 22 illustrates the disposed position of B-hook 41 and B-hook retainer 11 when force 71 is removed. The inherent flexible nature of leg 70 of B-hook retainer 11 is to lift B-hook 41 through a path 73. Retention of B-hook 41 is maintained by the contact of leg 70 with surface 72 of anchor aperture 30 and B-hook neck 55 with surface 63 of anchor aperture 30 which results in B-hook head 54 disposed behind car structure 24 preventing undesired removal of B-hook 41 from anchor aperture 30. Removal of B-hook 41 from anchor aperture 30 is accomplished by reversing the previously disclosed insertion method.

Figure 23:
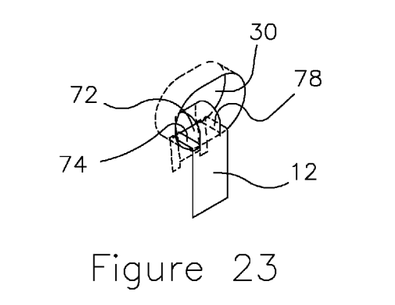
FIG. 23 is a diagrammatic perspective view showing an anchor aperture, and an alternate independently mounted B-hook retainer disposed to receive the B-hook.

An alternate B-hook retainer 12 disposed in anchor aperture 30 is illustrated in FIG. 23. Arms 74, 78 of B-hook retainer 12 are intended to seat up against surface 72 of anchor aperture 30. B-hook retainer 12 is an alternative to B-hook retainers 10 and 11. B-hook retainer 12 would be desired when a retention method is desired that is independent of B-hook 40 and not supported by additional car structure 37 as previously disclosed.

Figure 24:
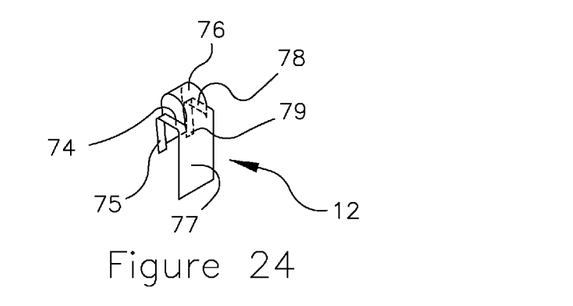
FIG. 24 is a diagrammatic perspective view showing the alternate independently mounted B-hook retainer.

B-hook retainer 12 consists of arms 74, 78 and extensions 75, 77, 79 along with tab 76 as shown in FIG. 24 and is made of a flexible material that allows B-hook retainer 12 to serve its intended function. Extensions 75, 77, 79 are spaced and sized to fit and align B-hook retainer 12 in respect to anchor aperture 30 and car structure 24. B-hook retainer 12 is allowed to be tailored and will be apparent to those skilled in the art.

Figure 25:
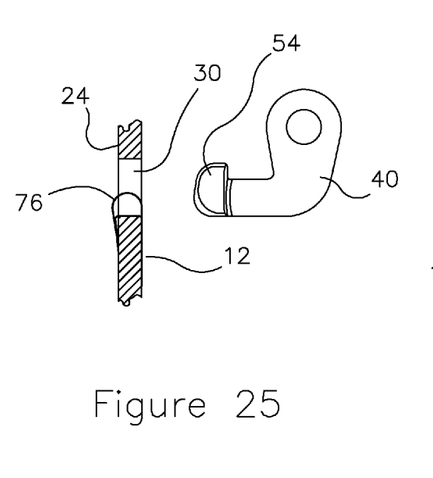
FIG. 25 is a side elevational view with the alternate independently mounted B-hook retainer shown in FIG. 23 with the B-hook disposed to enter the anchor aperture provision.

The side elevational view of FIG. 25 further illustrates what is shown in FIG. 23 along with B-hook 40 disposed to enter anchor aperture 30. Tab 76 of B-hook retainer 12 is shown disposed in its free state in respect to B-hook head 54 of B-hook 40. B-hook retainer 12 consists of a flexible material that allows tab 76 of B-hook retainer 12 to flex and allow the insertion of B-hook 40 into anchor aperture 30.

Figure 26:
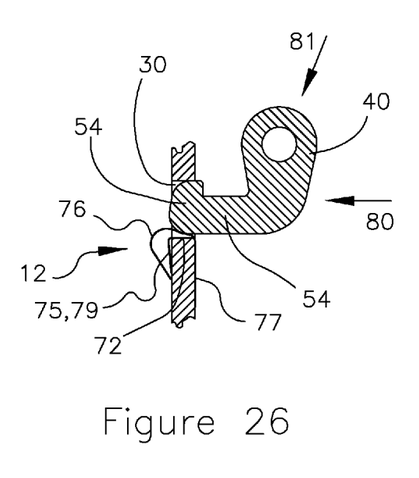
FIG. 26 is a side elevational view with the alternate independently mounted B-hook retainer shown in FIG. 25 disposing out of the way to allow insertion of the B-hook into the anchor aperture provision.

FIG. 26 illustrates a sectional side elevational view of B-hook head 54 along with B-hook neck 55 of B-hook 40 orientated and moved partially through anchor aperture 30 when B-hook 40 is tipped sideways similar to what is shown in FIGS. 8 and 9. A force 81 is applied to B-hook 40 so as to dispose tab 76 of B-hook retainer 12 toward surface 72 in anchor aperture 30 that also disposes tab 76 up against B-hook neck 55 of B-hook 40 allowing such insertion action along path 80. Extensions 75, 77, 79 of B-hook retainer 12 are sized and shaped so as to maintain B-hook retainer 12 in place with respect to anchor aperture 30 during such insertion action of B-hook 40.

Figure 27:
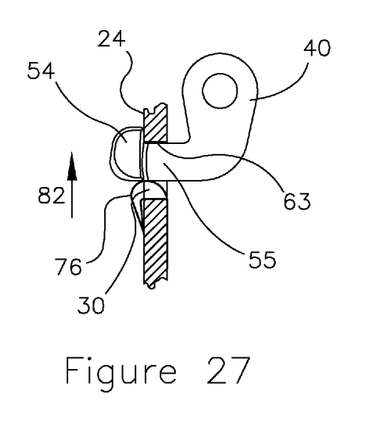
FIG. 27 is a side elevational view of the B-hook adequately inserted into the alternate independently mounted B-hook retainer and anchor aperture arrangement with the alternate independently mounted B-hook retainer disposed so as to lift the B-hook in a substantially upward orientation in respect to the anchor aperture provision.

FIG. 27 illustrates the disposed position of B-hook 40 and B-hook retainer 12 when force 81 is removed. The inherent flexible nature of tab 76 of B-hook retainer 12 lifts B-hook 40 through a path 82. Retention of B-hook 40 is maintained by the contact of B-hook neck 55 with surface 63 of anchor aperture 30 which results in B-hook head 54 disposed behind car structure 24 preventing undesired removal of B-hook 40 from anchor aperture 30. Extensions 75, 77, 79 of B-hook retainer 12 are also sized and shaped so as to maintain B-hook retainer 12 in place with respect to anchor aperture 30 during normal usage of B-hook 40.

Figure 28:
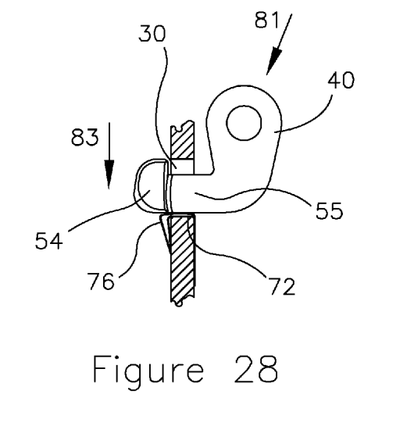
FIG. 28 is a side elevational view of the B-hook disposed in a downward orientation in respect to the anchor aperture provision with the alternate independently mounted B-hook retainer allowing such action.

Removal of B-hook 40 from anchor aperture 30 is accomplished by reversing the previously disclosed insertion method. FIG. 28 illustrates the first step of such removal action by applying a force 81 to B-hook 40 to dispose B-hook neck 55 through path 83 to flex tab 76 toward surface 72 in anchor aperture 30 in such a manner so as to also dispose B-hook head 54 to be aligned with anchor aperture 30. Extensions 75, 77, 79 of B-hook retainer 12 are sized and shaped so as to maintain B-hook retainer 12 in place with respect to anchor aperture 30 during such removal action of B-hook 40 and also after B-hook 40 has been removed.

Figure 29:
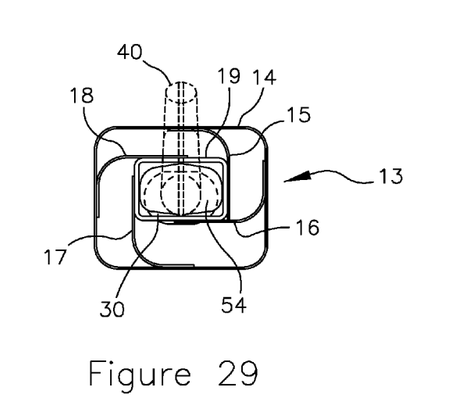
FIG. 29 is a frontal elevational view of a B-hook within an anchor aperture provision disposed with an additional alternate independently mounted B-hook retainer arrangement.

FIG. 29 illustrates a back elevational view of alternate B-hook retainer 13 contained and supported by additional car structure 37. FIG. 3 illustrated the preferred B-hook retainer 10 when it is desired to retain B-hook 40 with a method supported by additional car structure 37. Alternate B-hook retainer 13 serves substantially the same function as B-hook retainer 10 and is offered as an alternative to a compressible and resilient material. B-hook retainer 13 consists of flexible arms 15, 16, 17, 18 that are joined to outside housing 14 that is sized and shaped to conform and supported by car structures 24,37. B-hook retainer 13 also includes an inside housing 19 that is adjacent to anchor aperture 30 and is sized and shaped so as to close off part of the opening in anchor aperture 30 and is allowed to float and be positionally balanced by flexible arms 15, 16, 17, 18. FIG. 29 further illustrates a back view of B-hook head 54 of B-hook 40 already inserted through anchor aperture 30 and supported and positioned within inside housing 19 with substantially no forces applied to B-hook 40 or in the case when slack develops in lading tie strap 29. B-hook 40 is inserted through anchor aperture 30 as previously taught and illustrated by FIGS. 8, 9 with the addition of contacting inside housing 19 and disposing it appropriately to allow such action. B-hook retainer 13 is sized and shaped so as to provide appropriate lift to B-hook 40 and maintain retention of B-hook 40 in anchor aperture 30.

Figure 30:
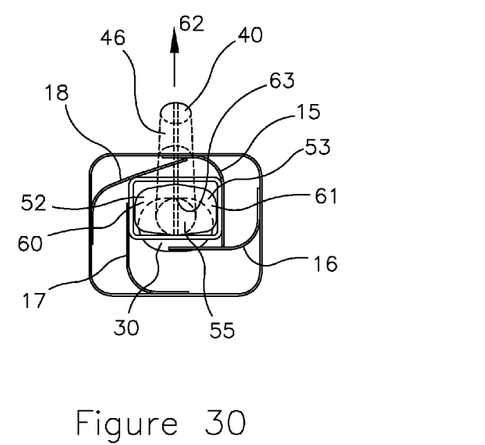
FIG. 30 is a frontal elevational view of a B-hook in a substantially upward orientation in respect to the anchor aperture provision resulting in disposing the alternate independently mounted B-hook retainer arrangement.

B-hook 40 disposed in an upward orientation along path 62 in respect to anchor aperture 30 as would be the case when tension is applied by way of through hole provision 46 is shown in FIG. 30. Flexible arm 18 is shown disposed to allow such action. B-hook neck 55 is shown pulled up against and making contact at surface 63 of anchor aperture 30. Lobes 52, 53 of B-hook 40 are shown behind car structure 24 respectively. The combination of lobes 52, 53 and B-hook neck 55 of B-hook 40 making contact with car structure surfaces 60, 61, 63 respectively provides proper support to secure lading 22. FIG. 30 illustrates the upwards orientation of B-hook 40 with respect to anchor aperture 30 as would be the case for overhead securing of lading 22 by way of lading tie strap 29 as shown in FIG. 2.

Figure 31:
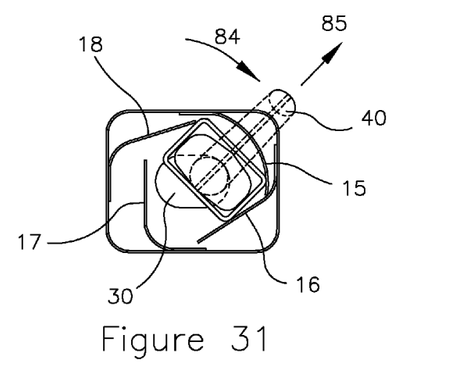
FIG. 31 is a frontal elevational view of a B-hook in a substantially upward and sideways tipped orientation in respect to the anchor aperture provision resulting in disposing the alternate independently mounted B-hook retainer arrangement in a different manner.

Illustrated in FIG. 31 are flexible arms 15, 16, 18 of B-hook retainer 13 being disposed to allow B-hook 40 to rotate through a path 84. This action allows angular orientation of lading tie straps 25, 26, 27, 28 respectively as illustrated in FIG. 2. When tension force 85 is removed and slack develops in lading tie straps 25, 26, 27, 28 flexible arms 15, 16, 18 of B-hook retainer 13 are sized and shaped so as to provide lift and rotation back through path 84 to B-hook 40 to a balanced position as shown in FIG. 29 and maintain retention of B-hook 40 in anchor aperture 30.

Figure 32:
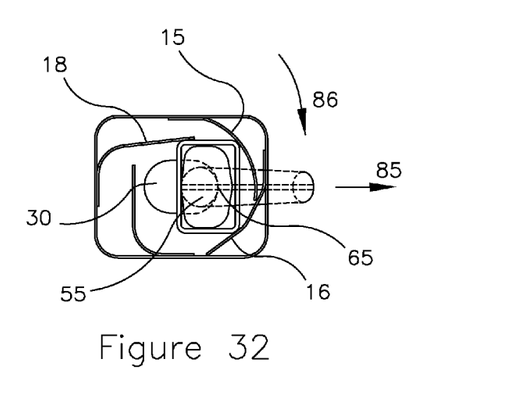
FIG. 32 is a frontal elevational view of a B-hook in a substantially sideways orientation in respect to the anchor aperture provision resulting in disposing the alternate independently mounted B-hook retainer arrangement in a different manner.

FIG. 32 illustrates flexible arms 15, 16, 18 of B-hook retainer 13 being further disposed to allow B-hook 40 to rotate through an addition path 86. This action allows angular and substantially horizontal orientation of lading tie straps 25, 26, 27, 28 when a tension force 85 is applied. When tension force 85 is removed and slack develops in lading tie straps 25, 26, 27, 28 flexible arms 15, 16, 18 of B-hook retainer 13 are sized and shaped so as to provide lift and rotation back through paths 84, 86 to B-hook 40 as shown in FIG. 29 and maintain retention of B-hook 40 in anchor aperture 30. B-hook 40 is removed through anchor aperture 30 as previously taught.

Figure 33:
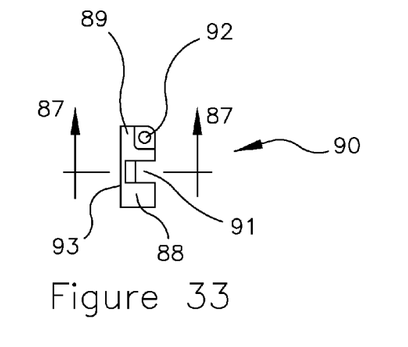
FIG. 33 is a side elevational view of an alternate B-hook retainer that is desired when a B-hook retention feature is desired that is independent of car structures and B-hooks.
Figure 34:
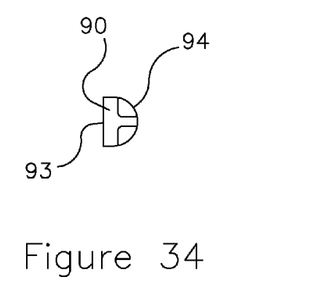
FIG. 34 is a top horizontal view of alternate B-hook retainer that is shown in FIG. 33.

A side elevational view of alternate B-hook retainer 90 is shown in FIG. 33. B-hook retainer consists of a bottom head 88 and top head 89 separated by a horizontal slot 91. The top head 89 is allowed to be shaped to offer a though hole 92 provision so as to offer a provision for attaching a cable or chain to said hole 92 and than attaching the other end of said cable or chain to other tie down hardware or tether so as not to inadvertently lose B-hook retainer 90 during non use or during storage of the respective lading tie strap 25, 26, 27, 28, 29. The back face 93 of B-hook retainer 90 is shaped substantially flat. The top horizontal view in FIG. 34 illustrates that the front face 94 of B-hook retainer 90 is substantially of a convex nature to correspond to anchor aperture 30 as herein disclosed and therefore B-hook retainer 90 comprises of a substantially semi-cylindrical member. Alternate B-hook retainer 90 is desired when a B-hook 40 retention feature is desired that is independent of alternate car structures 24, 37 and B-hooks 40, 41. B-hook retainer 90 is allowed to consist of any appropriate material that will provide the desired function as disclosed herein.

Figure 35:
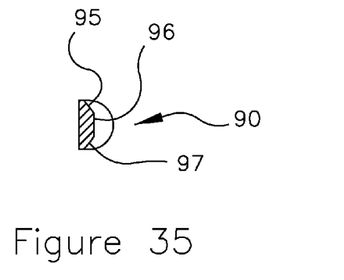
FIG. 35 is a sectional horizontal view of alternate B-hook retainer taken along section view 87 that is shown in FIG. 33.

A sectional horizontal view taken along section view 87 in FIG. 33 is shown in FIG. 35 illustrating that slot 91 consists of a substantially flat face 96 and two substantially sloping faces 95, 97. Faces 95, 96, 97 and slot 91 are tailored so as to provide the desired function as disclosed herein.

Figure 36:
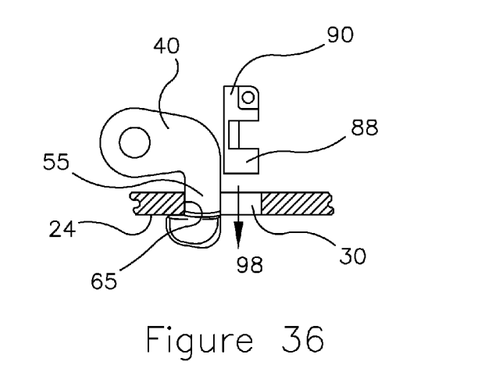
FIG. 36 is a side elevational view with the B-hook disposed within the anchor aperture ready to receive the alternate B-hook retainer that is shown in FIG. 33.

FIG. 36 is a sectional horizontal view of what is shown in FIG. 12 with the addition of B-hook retainer 90 disposed to enter anchor aperture 30 along path 98. To provide adequate room for bottom head 88 of B-hook retainer 90 to enter anchor aperture 30 B-hook 40 is to be moved horizontally through the clearance in anchor aperture 30 so that B-hook neck 55 contacts surface 65 of anchor aperture 30.

Figure 37:
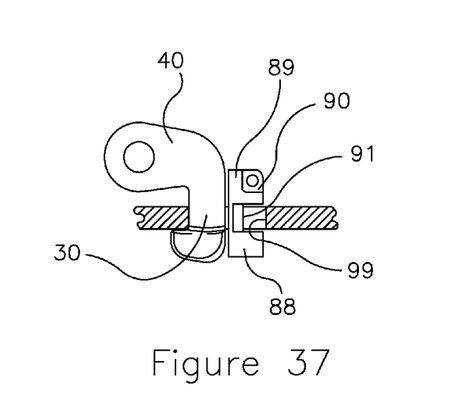
FIG. 37 is a side elevational view with the B-hook and alternate B-hook retainer disposed within the anchor aperture with the slotted section of alternate B-hook retainer centrally aligned with the car structure wall respective to the anchor aperture.
Figure 38:
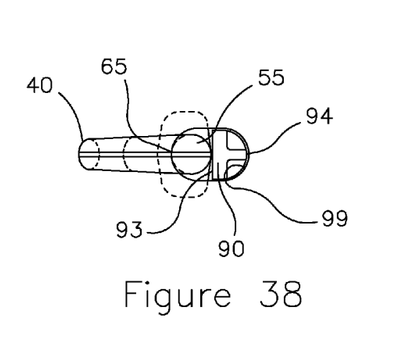
FIG. 38 is a frontal elevational view of the arrangement shown in FIG. 37 with the B-hook and alternate B-hook retainer disposed in a sideward orientation in respect to the anchor aperture provision shown.

B-hook retainer 90 is disposed so that horizontal slot 91 of B-hook retainer 90 is aligned with the wall thickness of anchor aperture 30 and car structure 24 as illustrated in FIG. 37. The bottom head 88 of B-hook retainer 90 is disposed behind car structure 24 and the top head 89 of B-hook retainer 90 is disposed in front of car structure 24. FIG. 38 illustrates a frontal elevational view of what is shown in FIG. 37 and more clearly shows that the convex nature of front face 94 of B-hook retainer 90 corresponds with the concave nature of surface 99 of anchor aperture 30. The combination of front face 94 and back face 93 of B-hook retainer 90 are sized and shaped to allow the insertion action previously disclosed.

Figure 39:
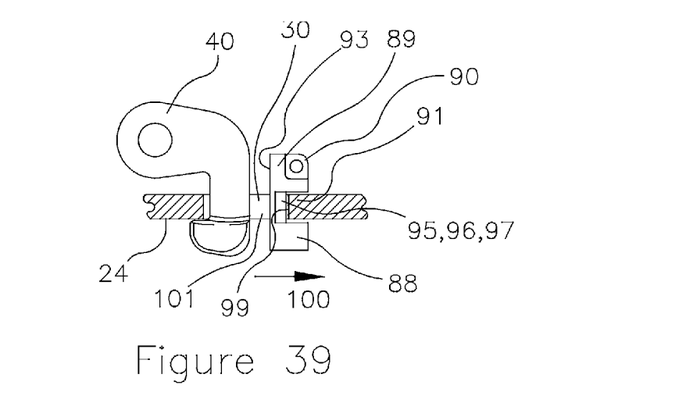
FIG. 39 is a side elevational view with the B-hook and alternate B-hook retainer disposed within the anchor aperture with the slotted section of alternate B-hook retainer additionally disposed through the anchor aperture clearance so the head components of alternate B-hook retainer are positioned relative to the front and back surfaces of the car structure.

B-hook retainer 90 is disposed through path 100 so that substantially flat face 96 and two substantially sloping faces 95, 97 of horizontal slot 91 of B-hook retainer 90 is aligned and contacts surface 99 of anchor aperture 30 and is illustrated in FIG. 39. This action results in bottom head 88 of B-hook retainer 90 being disposed behind car structure 24 and the top head 89 of B-hook retainer 90 being disposed in front of car structure 24 preventing removal of B-hook retainer 90 from anchor aperture 30. A gap 101 arises between B-hook neck 55 and back face 93 of B-hook retainer 90 in anchor aperture 30 and is allowed and does not detract from the desired retention of B-hook 40 and will become apparent to those skilled in the art.

Figure 40:
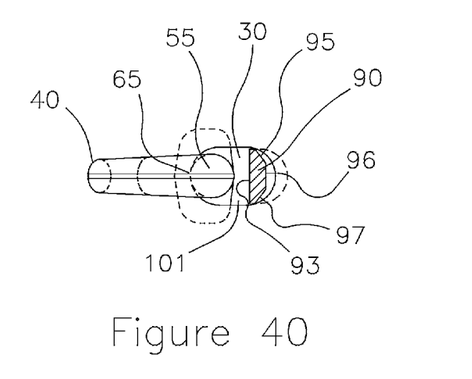
FIG. 40 is a frontal elevational view of the arrangement shown in FIG. 39 with the B-hook and alternate B-hook retainer disposed in a sideward orientation in respect to the anchor aperture provision shown.

FIG. 40 illustrates a partially sectioned frontal elevational view of what is shown in FIG. 39 and more clearly shows the disposed position of B-hook 40 and B-hook retainer 90 in respect to anchor aperture 30. FIG. 40 further illustrates that substantially flat face 96 and two sloping faces 95, 97 of horizontal slot 91 of B-hook retainer 90 are aligned and are not required to fully contact the entire substantially concave surface 99 of anchor aperture 30.

Figure 41:
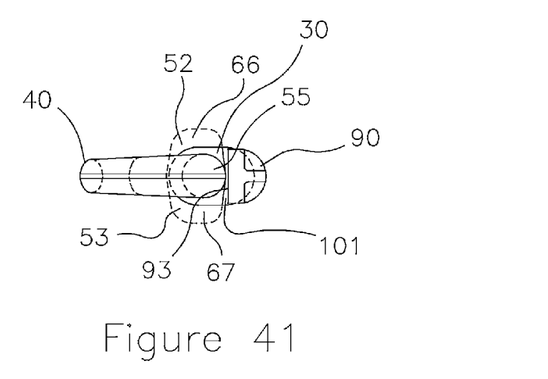
FIG. 41 is a frontal elevational view of the arrangement shown in FIG. 40 with the B-hook additionally disposed through the anchor aperture clearance so the B-hook neck becomes substantially close to the back surface of the alternate B-hook retainer.

B-hook neck 55 of B-hook 40 is shown in FIG. 41 disposed up against back face 93 of B-hook retainer 90 reducing gap 10 in anchor aperture 30 which could happen due to strap slack and illustrates that B-hook 40 remains retained by way of lobes 52, 53 coming into contact with surfaces 66, 67 respectively of car structure 24.

Figure 42:
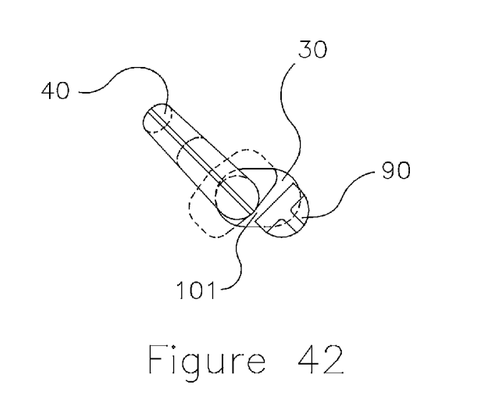
FIG. 42 is a frontal elevational view of the arrangement shown in FIG. 40 with the B-hook and alternate B-hook retainer disposed in a rotated angular orientation in respect to the anchor aperture provision shown.

B-hook 40 is shown disposed at an angular orientation in FIG. 42 from what is shown in FIG. 41 and simulates the position of B-hook 40 due to the orientation of lading tie straps 25, 26, 27, 28 shown in FIG. 2. B-hook retainer 90 is allowed to dispose about clearance 101 in anchor aperture 30 to allow the desired positioning of B-hook 40. When lading tie straps 25, 26, 27, 28 develop slack B-hook retainer 90 maintains B-hook 40 retention by way of a reduced gap 101 in anchor aperture 30.

Figure 43:
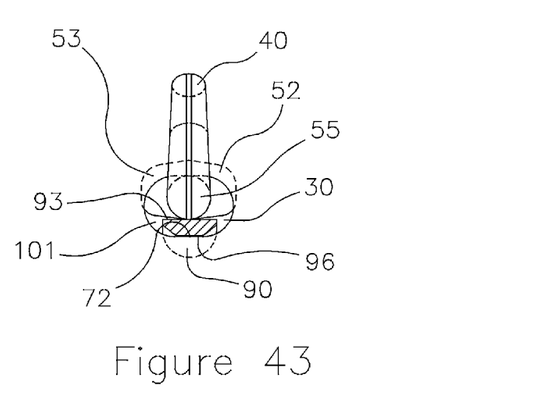
FIG. 43 is a frontal elevational view of the arrangement shown in FIG. 42 with the B-hook and alternate B-hook retainer further disposed in a rotated angular orientation so that the B-hook is in a substantially vertical position in respect to the anchor aperture provision shown.

B-hook 40 is shown disposed at a substantially vertical orientation in FIG. 43 from what is shown in FIGS. 41 and 42 and simulates the position of B-hook 40 due to the orientation of lading tie strap 29 shown in FIG. 2. B-hook retainer 90 is allowed to dispose about clearance 101 in anchor aperture 30 to allow the desired positioning of B-hook 40. When lading tie strap 29 develops slack B-hook retainer 90 maintains B-hook 40 retention by way of a reduced gap 101 in anchor aperture 30 and further resulting in lobes 52, 53 remaining behind car structure 24. FIG. 43 further illustrates substantially flat face 96 of B-hook retainer 90 coming into contact with surface 72 of anchor aperture 30.

Figure 44:
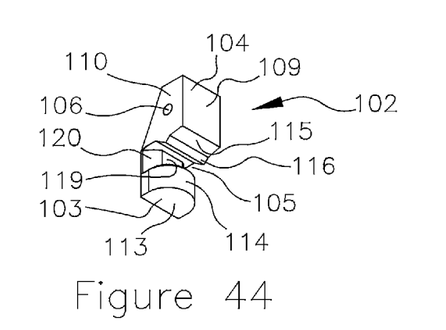
FIG. 44 is a diagrammatic perspective view showing an alternate B-hook retainer that is desired when a B-hook retention feature is desired that is independent of car structures and B-hooks.
Figure 45:
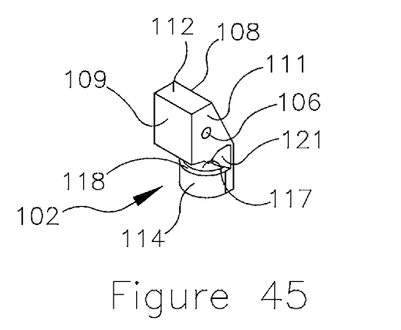
FIG. 45 is another diagrammatic perspective view showing an alternate B-hook retainer that is desired when a B-hook retention feature is desired that is independent of car structures and B-hooks.
Figure 46:
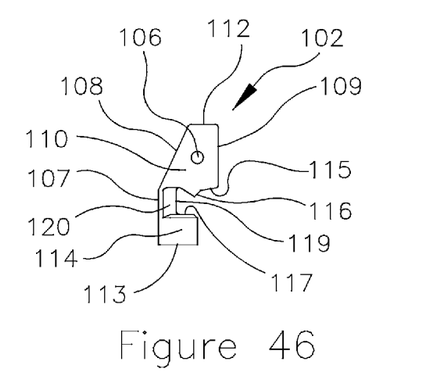
FIG. 46 is a side elevational view of an alternate B-hook retainer that is desired when a B-hook retention feature is desired that is independent of car structures and B-hooks.

An alternate B-hook retainer 102 is shown in FIGS. 44, 45, 46. B-hook retainer 102 consists of a bottom head 103 and top head 104 separated by a horizontal slot 105. The top head 104 is allowed to be shaped to offer a through hole 106 provision so as to offer a provision for attaching a cable or chain to said hole 106 and than attaching the other end of said cable or chain to other tie down hardware or tether so as not to inadvertently lose B-hook retainer 102 during non use or during storage of the respective lading tie strap 25, 26, 27, 28, 29. Back faces 107 and 108 of B-hook retainer 102 are shaped substantially flat. Back face 108 of B-hook retainer 102 slopes away from back face 107 as illustrated in FIG. 46 so as to provide proper function as described within. FIGS. 44, 45, 46 further illustrates that front face 109 and side faces 110 and 111 and top face 112 of top head 104 are substantially flat but are allowed to be tailored to provide the desired function. FIGS. 44, 45, 46 further illustrates that slot face 115 of top head 104 is substantially flat with a protrusion 116 projecting from slot face 115 to assist in providing the desired retaining function. Protrusion 116 projecting from slot face 115 is preferred but not required for proper function of B-hook retainer 102.

FIGS. 44, 45, 46 further illustrates that bottom face 113 of bottom head 103 is substantially flat but are allowed to be tailored to provide the desired function. It is further illustrated that front face 114 of bottom head 103 is substantially of a convex nature to correspond to anchor aperture 30 as herein disclosed and therefore B-hook retainer 102 comprises of a substantially semi-cylindrical member. FIGS. 44, 45, 46 further illustrates that slot face 117 of bottom head 103 is substantially flat with an edge relief 118 to assist in providing the desired retaining function. The use of edge relief 118 is preferred but not required for proper function of B-hook retainer 102.

FIGS. 44, 45, 46 illustrates that slot 105 consists of a substantially flat face 119 and two substantially sloping faces 120, 121. Faces 119, 120, 121 of slot 105 B-hook retainer 102 perform substantially the same function and is allowed to be tailored as earlier disclosed and shown in FIG. 35 that illustrates that slot 91 consists of a substantially flat face 96 and two substantially sloping faces 95, 97 of alternate B-hook retainer 90.

Alternate B-hook retainer 102 is desired when a B-hook 40 retention feature is desired that is independent of alternate car structures 24, 37 and B-hooks 40, 41. B-hook retainer 102 is allowed to consist of any appropriate material, preferably flexible in nature that will provide the desired function as disclosed herein.

Alternate B-hook retainer 102 is to enter anchor aperture 30 using the same method as previously disclosed and illustrated by alternate B-hook retainer 90 in FIG. 36 after B-hook 40 has been appropriately positioned within aperture 30.

Figure 47:
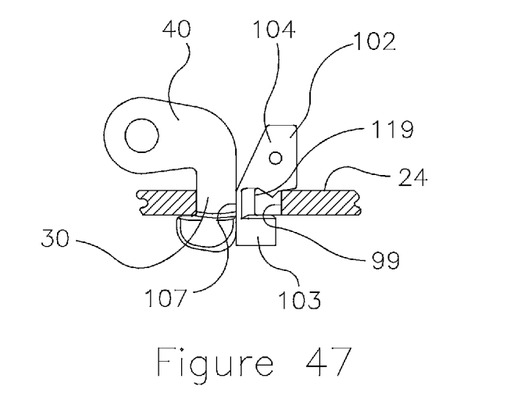
FIG. 47 is a side elevational view with the B-hook and alternate B-hook retainer disposed within the anchor aperture with the slotted section of alternate B-hook retainer centrally aligned with the car structure wall respective to the anchor aperture.

B-hook retainer 102 is disposed so that horizontal slot 105 of B-hook retainer 102 is aligned with the wall thickness of anchor aperture 30 and car structure 24 as illustrated in FIG. 47. The bottom head 103 of B-hook retainer 102 is disposed behind car structure 24 and the top head 104 of B-hook retainer 102 is disposed in front of car structure 24. The convex nature of front face 114 of bottom head 103 of B-hook retainer 102 corresponds with the concave nature of surface 99 of anchor aperture 30. The combination of front face 114 and back face 107 of B-hook retainer 102 are sized and shaped to allow the insertion action previously disclosed.

Figure 48:
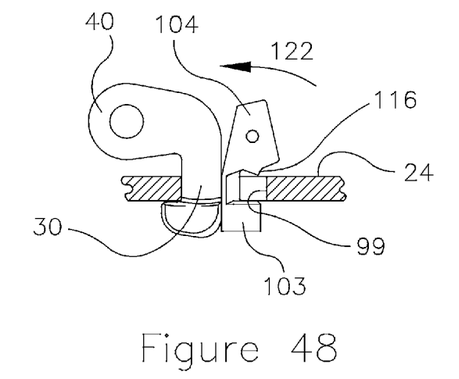
FIG. 48 is a side elevational view with the B-hook and alternate B-hook retainer disposed within the anchor aperture with the top head section of alternate B-hook retainer rotationally disposed so as to allow the slot faces of the alternate B-hook retainer to be further positioned relative to the front and back surfaces of the car structure.

FIG. 48 illustrates the flexible nature of B-hook retainer 102 by allowing top head 104 to be flexed through a path 122 while keeping bottom head 103 through aperture 30 resulting in protrusion 116 to raise above car structure 24. This action results in slot 105 of B-hook retainer 102 to become wider than the thickness of car structure 24 of aperture 30.

Figure 49:
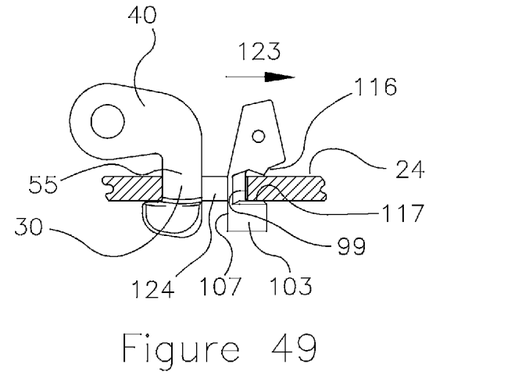
FIG. 49 is a side elevational view with the B-hook and alternate B-hook retainer disposed within the anchor aperture with the slotted section of alternate B-hook retainer additionally disposed through the anchor aperture clearance so the head components of alternate B-hook retainer are positioned relative to the front and back surfaces of the car structure.

B-hook retainer 102 is disposed through path 123 so that substantially flat face 119 and two substantially sloping faces 120, 121 of horizontal slot 105 of B-hook retainer 102 is aligned and contacts surface 99 of anchor aperture 30 and is illustrated in FIG. 49. This action results in bottom head 103 of B-hook retainer 102 being disposed behind car structure 24 and the top head 104 of B-hook retainer 102 being disposed in front of car structure 24 preventing removal of B-hook retainer 102 from anchor aperture 30. An added characteristic of B-hook retainer 102 from previously disclosed B-hook retainer 90 is that once operator installation intervention is removed, the shape memory and flexible nature of B-hook retainer 102 results in protrusion 116 and slot face 115 desiring to flex and return to their initial position and narrowing the width of slot 105. This action results in applying a compressive force against the thickness of car structure 24 by the squeezing action of protrusion 116 and slot face 115 of top head 104 and slot face 117 of bottom head 103. A gap 124 arises between B-hook neck 55 and back face 107 of B-hook retainer 102 in anchor aperture 30 and is allowed and does not detract from the desired retention of B-hook 40 and will become apparent to those skilled in the art.

B-hook 40 may be disposed at an angular orientation or a substantially vertical orientation or horizontal orientation the same as what is previously disclosed and shown in FIGS. 41, 42 and 43. B-hook retainer 102 is allowed to translate substantially like B-hook retainer 90 and as necessary to allow such action.

The number and location of said B-hook retainers 10, 11, 12, 13, 90, 102 are tailored to provide the desired securement options desired by the user and thereto will be apparent to those skilled in the art.

The applicant's invention of said B-hook retainers 10, 12, 13, 90, 102 allows the use of the prior art B-hook 40 and is an additional enhancement feature which allows lading tie strap 25, 26, 27, 28, 29 to be used by the user.

Although the invention is described with respect to a preferred embodiment, modifications thereto will be apparent to those skilled in the art. Therefore, the scope of the invention is to be determined by reference to such claims as may be submitted.

In accordance with our invention we claim:

1. A rail car hook retainer for retaining a B-hook having projecting locking lobes, the retainer being mounted in association with a pocket in a surface of a rail car, the pocket having top, bottom, side and rear walls defining a opening, the opening being closed with a shaped plate, the pocket and plate coacting to secure lading tie straps and hardware, said tie straps being adapted to be tensioned to secure lading in the rail car, and untensioned to enable each strap to be in a slack condition, a shaped anchor aperture formed and arranged to receive the B-hook and have a hook engaging lip to engage the lobes said retainer comprising:

said retainer being formed and arranged to maintain the B-hook in the anchor aperture when the tie strap is untensioned;

said retainer being formed of a compressible and resilient material and mounted in association with the B-hook and aperture so that when the B-hook is maneuvered through anchor aperture the retainer is compressed, and when the tie strap is slack, the resilience of the retainer maintains the B-hook in the aperture to prevent inadvertent removal of the B-hook from the shaped aperture resulting in the lading tie strap no longer securing the lading to the rail car.

2. The retainer of claim 1 further comprising:

said retainer is sized and shaped so as to provide lift to the B-hook and maintain retention of B-hook in the anchor aperture when slack develops in the tie strap.

3. The retainer of claim 2 further comprising:

said retainer permits removal of the B-hook from the anchor aperture by compressing to enable the B-hook lobes to pass through the aperture.

4. The retainer of claim 3 further comprising:

said retainer is one of an elastomeric member fitting in the pocket, a spring member clipping to said plate, a spring member clipping to the B-hook, or a spring assembly acting on the pocket walls or a wedge member.

5. The retainer of claim 4 further comprising:

said retainer is an elastomeric member fitting in the pocket;

said elastomeric has a base surface, first and second side surfaces and a top surface;

said surface are arranged to form a base portion and a projecting portion and a recessed portion;

said base portion spans the pocket;

said projecting portion maintaining the B-hook in a selected position;

said projecting portion distorting adjacent said recessed portion to permit rotation and removal of the B-hook.

6. The retainer of claim 4 further comprising:

a spring member clipping to said plate, said spring member clipping to said plate being formed of an arm, an inner extension depending downwardly from said arm, and an outer extension depending downwardly from said arm, said inner extension and outer extension being spaced from one another;

a web being formed to define a spring tab;

said spring tab extending upwardly from said arm adjacent said outer extension to a hook support portion and extending to an inner tab end;

said spring tab end and said arm retaining said spring member clipping to said plate in engagement with the lip when no B-hook is engaged;

said spring tab distorting to permit engagement and disengagement of the B-hook;

said spring tab coacting with said arm and inner and outer extensions to maintain the B-hook in engagement with the plate when the lading tie-strap is slack.

7. The retainer of claim 4 further comprising:

a spring member clipping to the B-hook, said spring member clipping to the B-hook having a first hook attaching tab and a second hook attaching tab projecting from a central portion;

said central portion having a leg projecting inwardly toward B-hook lugs;

said leg formed to have a plate engaging pawl;

said pawl engaging the lip when said B-hook is inserted through the aperture.

8. The B-hook of claim 7 further comprising:

the B-hook is formed to have said first and second lugs projecting sidewardly therefrom;

said lugs receiving said tabs.

9. The retainer of claim 4 further comprising:

said spring assembly acting on the pocket walls with multiple leaf springs holding the B-hook in place said leaf springs formed of a plurality of substantially arcuate arms;

said arms each having a first end attached to an outer housing and a second end distal from said first end;

an inner housing attached to each of said second ends said inner housing receiving the lobes of the B-hook;

said inner housing receiving spring support from said arms tending to retain said B-hook in said inner housing;

said inner housing being displaceable within the outer housing to maintain said B-hook in a substantially vertical first position and alternatively in a horizontal second position.

10. The retainer of claim 4 further comprising:

a saddle member which fits over the lip;

said saddle member having a top head and a bottom head, said heads defining a slot between them;

a back face extending between said heads opposite said slot;

said slot formed and arranged to have a flat face and first and second sloping faces opposite one another;

said sloped faces substantially spanning the aperture in a first orientation and partially spanning the aperture in a second orientation;

a height of the saddle between the flat face and the back face substantially equaling a space between the B-hook and the lip when the B-hook is inserted in the aperture.

11. The retainer of claim 10 and one of said top head or bottom head is adapted to receive a tether.

12. The retainer of claim 4 further comprising:

a saddle member formed with a bottom head and a top head defining a horizontal slot therebetween;

a substantially flat back face and a sloped back face being opposite said slot;

said saddle member engages said lip with a front face, a plurality of side faces and a substantially flat top face formed in said slot, and said bottom head is formed with an arcuate surface opposite said back face.

13. The retainer of claim 12 and said slot being formed by a slot face of said top head having a protrusion projecting from slot face into said slot.

14. The retainer of claim 12 and one of said top head or bottom head is adapted to receive a tether.

* * * * *